US008809754B2

(12) United States Patent
Conatser et al.

(10) Patent No.: US 8,809,754 B2
(45) Date of Patent: Aug. 19, 2014

(54) MICROWAVE HEATING PACKAGE FOR FROZEN FOOD ITEMS

(75) Inventors: Robert L. Conatser, Golden, CO (US); Weston R. Wilson, Arvada, CO (US); Kelly R. Fitzwater, Lakewood, CO (US)

(73) Assignee: Graphic Packaging International, Inc., Atlanta, GA (US)

( * ) Notice: Subject to any disclaimer, the term of this patent is extended or adjusted under 35 U.S.C. 154(b) by 683 days.

(21) Appl. No.: 13/044,768

(22) Filed: Mar. 10, 2011

(65) Prior Publication Data

US 2011/0220640 A1 Sep. 15, 2011

Related U.S. Application Data

(60) Provisional application No. 61/339,972, filed on Mar. 11, 2010, provisional application No. 61/343,955, filed on May 6, 2010.

(51) Int. Cl.

| | |
|---|---|
| ***H05B 6/64*** | (2006.01) |
| ***H05B 6/80*** | (2006.01) |
| ***B32B 27/32*** | (2006.01) |

(52) U.S. Cl.

USPC ........................... 219/759; 219/730; 428/35.2

(58) Field of Classification Search

CPC ..................... B65D 81/3453; B65D 2581/344; B65D 2581/3452; B65D 2581/3477; B65D 2581/3479; B65D 2581/3495; B65D 2581/3472; H05B 6/6494

USPC .................. 219/759, 728–730, 725; 426/107; 428/34.2, 38, 182, 35.2

See application file for complete search history.

(56) References Cited

U.S. PATENT DOCUMENTS

| | | | |
|---|---|---|---|
| 4,283,427 | A | 8/1981 | Winters et al. |
| 4,943,456 | A | 7/1990 | Pollart et al. |
| 5,002,826 | A | 3/1991 | Pollart et al. |
| 5,118,747 | A | 6/1992 | Pollart et al. |
| 5,334,820 | A | 8/1994 | Risch et al. |
| 5,410,135 | A | 4/1995 | Pollart et al. |
| 5,412,187 | A | 5/1995 | Walters et al. |
| 5,530,231 | A | 6/1996 | Walters et al. |
| 6,204,492 | B1 | 3/2001 | Zeng et al. |
| 6,433,322 | B2 | 8/2002 | Zeng et al. |

(Continued)

FOREIGN PATENT DOCUMENTS

| | | |
|---|---|---|
| JP | S61-202367 | 12/1986 |
| JP | H07-257633 | 10/1995 |

(Continued)

OTHER PUBLICATIONS

International Search Report—PCT/US2009/063963.

(Continued)

*Primary Examiner* — Quang Van

(74) *Attorney, Agent, or Firm* — Womble Carlyle Sandridge & Rice, LLP

(57) ABSTRACT

A microwave energy interactive structure includes a susceptor film comprising microwave energy interactive material on a polymer film, a support layer joined to the microwave energy interactive material, and an adjoining layer joined to the support layer. The adjoining layer comprises a paper-based material having a machine direction and a cross direction. The adjoining layer is joined to the support layer by an adhesive region extending in the cross direction across at least a portion of the adjoining layer.

33 Claims, 4 Drawing Sheets

(56) References Cited

U.S. PATENT DOCUMENTS

| | | | | |
|---|---|---|---|---|
| 6,552,315 | B2 | 4/2003 | Zeng et al. | |
| 6,677,563 | B2 | 1/2004 | Lai | |
| 7,019,271 | B2 | 3/2006 | Wnek et al. | |
| 7,351,942 | B2 | 4/2008 | Wnek et al. | |
| 8,063,345 | B2 * | 11/2011 | Middleton et al. | 219/730 |
| 2004/0023000 | A1 * | 2/2004 | Young et al. | 428/138 |
| 2007/0039951 | A1 | 2/2007 | Cole | |
| 2007/0228036 | A1 | 10/2007 | Noyelle et al. | |
| 2007/0246460 | A1 | 10/2007 | Ford et al. | |
| 2008/0035634 | A1 | 2/2008 | Zeng et al. | |
| 2008/0078759 | A1 | 4/2008 | Wnek et al. | |
| 2008/0087664 | A1 | 4/2008 | Robison et al. | |
| 2009/0218338 | A1 | 9/2009 | Fitzwater | |
| 2009/0302032 | A1 | 12/2009 | Middleton | |
| 2010/0012652 | A1 | 1/2010 | Cole | |
| 2010/0213192 | A1 | 8/2010 | Middleton et al. | |

FOREIGN PATENT DOCUMENTS

| | | | |
|---|---|---|---|
| JP | 2001-246690 | | 9/2001 |
| JP | 2002-193314 | | 7/2002 |
| JP | 2003-071965 | | 3/2003 |
| JP | 2009-179362 | | 8/2009 |
| WO | WO 2007/127371 | A2 | 11/2007 |
| WO | WO 2010/056696 | A2 | 5/2010 |

OTHER PUBLICATIONS

Written Opinion—PCT/US2009/063963.

International Search Report—PCT/US2011/027825.

Written Opinion—PCT/US2011/027825.

Japanese Patent Application No. 2012-557234, Office Action dated Oct. 31, 2013.

* cited by examiner

MICROWAVE HEATING PACKAGE FOR FROZEN FOOD ITEMS

CROSS-REFERENCE TO RELATED APPLICATIONS

This application claims the benefit of U.S. Provisional Application No. 61/339,972, filed Mar. 11, 2010, and U.S. Provisional Application No. 61/343,955, filed May 6, 2010, both of which are incorporated by reference herein in their entirety.

BACKGROUND

Susceptors are often used in conventional microwave heating packages to enhance the heating, browning, and/or crisping of food items. A susceptor generally comprises a thin layer of microwave energy interactive material (generally less than about 100 angstroms in thickness, for example, from about 60 to about 100 angstroms in thickness, and having an optical density of from about 0.15 to about 0.35, for example, about 0.17 to about 0.28) that tends to absorb at least a portion of impinging microwave energy and convert it to thermal energy (i.e., heat) at the interface with the food item. Susceptors are typically supported on a microwave energy transparent substrate, for example, a polymer film, thereby collectively forming a "susceptor film". Susceptor films, in turn, are often joined (e.g., adhered) to a dimensionally stable supporting material (or "support"), for example, paper, paperboard, or a polymer film, to collectively define a "supported susceptor film".

Supported susceptor films may be used alone or in combination with numerous other materials to form various microwave heating packages, cartons, or other constructs. In many cases, a "patch" (i.e., a piece) of supported susceptor film is applied to a microwave heating package in one or more areas to provide the desired level of heating, browning, and/or crisping of the food item.

In many instances, the package or carton may generally be erected from a flat blank comprising a disposable material, for example, a paper-based material such as paper or paperboard. Such paper-based materials generally exhibit alignment of fibers in the machine direction (MD), such that the length of the fiber extends along the machine direction and the width of the fiber extends along the cross direction (CD) (or cross machine direction) of the paper-based material (e.g., paper or paperboard).

It has been observed that in many freezers (e.g., grocer's freezers), where the microwave heating package may be subjected to periodic thaw cycles (in which warm air is introduced into the freezer to prevent frost buildup), the panel or portion of the package to which the supported susceptor is joined may tend to buckle or warp, typically in the unadhered (e.g., unglued) areas. While not wishing to be bound by theory, it is believed that this warping or buckling is due to the change in humidity of the freezer during the thaw cycles. As the humidity increases, the fibers tend to absorb water and expand. The fibers tend to expand to a greater extent in a direction perpendicular to the orientation of the fibers, i.e., through the width of the fibers, rather than the length. As a result, the paper or paperboard tends to buckle or warp in the cross direction (CD) of the panel. It has also been observed that the degree and pattern of buckling may depend on the pattern of adhesion of the susceptor patch.

It has been observed that using a full coverage adhesive may address this problem. However, such structures have been shown to be prone to delamination during heating.

While not wishing to be bound by theory, it is believed that during heating, the moisture in the support layer and/or adhesive is released as water vapor, which exerts a pressure on the adjacent layers of the structure. With insufficient pathways for the water vapor to escape, the layers of the structure tend to delaminate and loft away from one another. In some cases, this lofting or pillowing of the structure can cause a food item seated on the structure to be turned over or toppled undesirably.

It has been suggested that using of a patterned adhesive may alleviate this problem. For example, International Patent Application No. PCT/US09/063963, filed Nov. 11, 2009, which is incorporated by reference herein in its entirety, discloses the use of a patterned adhesive in various susceptor structures. The spaces between the adhered areas are believed to serve as pathways for transporting water vapor away from the structure, thereby preventing delamination of the adjoined layers.

Accordingly, there is a need for a package including a supported susceptor film that can withstand the absorption of moisture during a thaw cycle in a freezer without warping. There may further be a need in some instances for a package including a susceptor film that can further allow for the release of moisture from the support layer during microwave heating to prevent delamination.

SUMMARY

This disclosure relates generally to various microwave energy interactive structures, various constructs formed from such structures, various methods of making and such structures and constructs, and various methods of using such structures and constructs to heat, brown, and/or crisp a food item in a microwave oven.

The structures generally comprise a supported susceptor film, which includes microwave energy interactive material disposed between a polymer film layer and a support layer, and an adjoining layer, for example, paper or paperboard. The supported susceptor film may be joined to the adjoining layer in any suitable manner, for example, using an adhesive material. At least a portion of the adhesive may be configured to extend in the cross direction (CD) across at least a portion of the adjoining layer to stabilize the adjoining layer during thaw cycles in a freezer. Where needed, the adhesive configuration also may facilitate venting of any moisture in the susceptor structure to prevent any uncontrolled or undesirable delamination of the structure during microwave heating.

The susceptor structure may be used to form (or may comprise a portion of) numerous constructs, packages, or apparatuses for heating, browning, and/or crisping a food item in a microwave oven. Some of such constructs may include, but are not limited to, cartons, trays, platforms, sleeves, disks, cards, or pouches.

Other features, aspects, and embodiments of the invention will be apparent from the following description and accompanying figures.

BRIEF DESCRIPTION OF THE DRAWINGS

The description refers to the accompanying schematic drawings in which like reference characters refer to like parts throughout the several views, and in which.

DESCRIPTION

Various aspects of the invention may be understood further by referring to the figures. For purposes of simplicity, like numerals may be used to describe like features. It will be understood that where a plurality of similar features are depicted, not all of such features necessarily are labeled on each figure. It also will be understood that the various components used to form the constructs may be interchanged. Thus, while only certain combinations are illustrated herein, numerous other combinations and configurations are contemplated hereby.

Figure 1A:
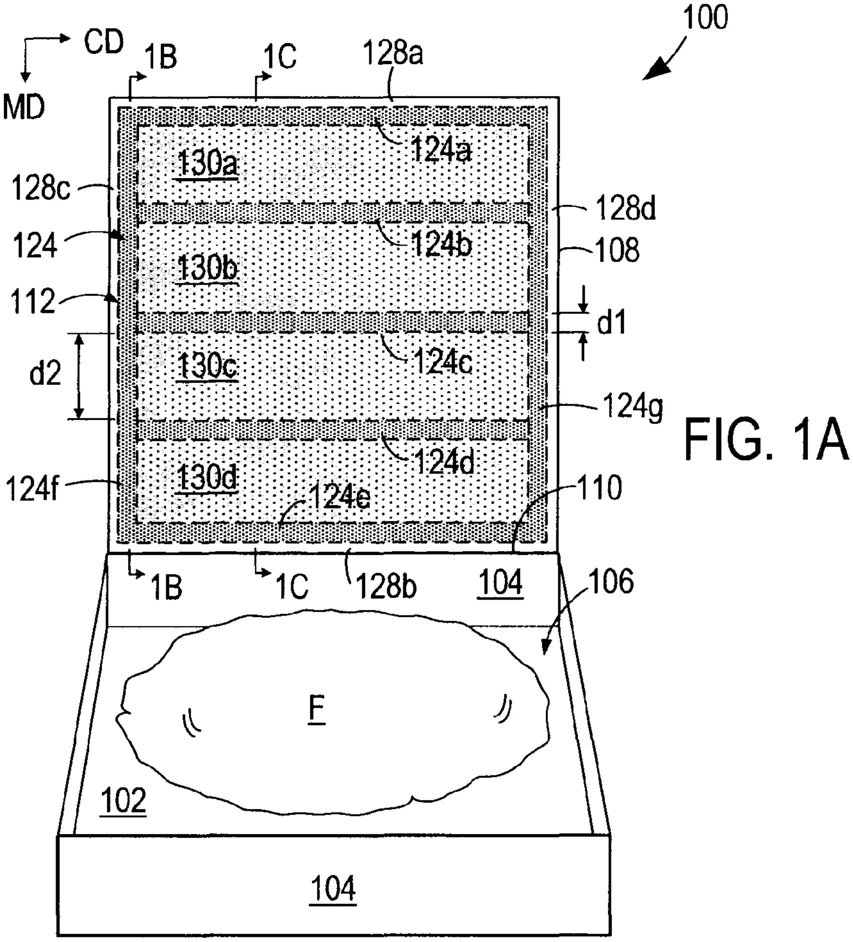
FIG. 1A is a schematic perspective view of an exemplary microwave heating package or carton, including a supported susceptor structure joined to the top panel using an adhesive having a first exemplary configuration.

FIG. 1A schematically illustrates a microwave heating package or carton 100. The carton may generally be used to contain and a heat frozen food item in a microwave oven. The carton 100 generally includes a base or bottom panel 102 and a plurality of upstanding side panels walls 104 that define an interior space 106 for receiving and containing a food item F. A top panel or lid 108 is hingedly or foldably joined to an upper edge of one of the walls 104. If desired, the top panel 108 may be joined to the respective wall 104 along a line of disruption 110, for example, a cut-space line or tear line, to facilitate removal of the top panel 108, as will be discussed further below. It will be noted that in FIG. 1A, the top panel 108 is shown in an open configuration, with the top panel 108 generally extending upwardly from the attached side wall 104. In a closed position (not shown), the top panel or lid 108 is substantially parallel to the base or bottom panel 102. A supported susceptor film or "patch" 112 (shown schematically with stippling in FIG. 1A) is joined to an interior side of the top panel 108 (i.e., the side of the top panel facing the interior space when the top panel is in the closed configuration). However, in other embodiments, the supported susceptor film 112 may be joined one or more other panels or parts of the carton 100 or other construct.

Figure 1B:
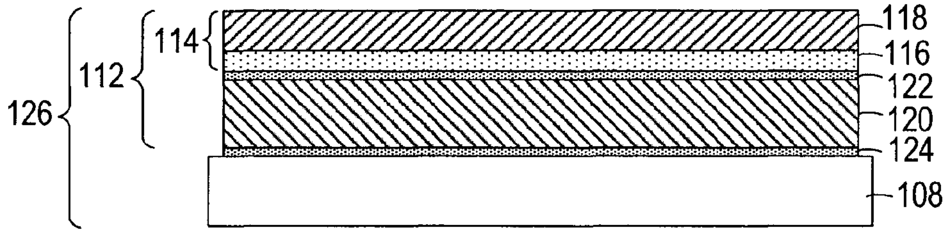
FIG. 1B is a schematic cross-sectional view of the top panel of the carton of FIG. 1A, taken along a line 1B-1B.
Figure 1C:
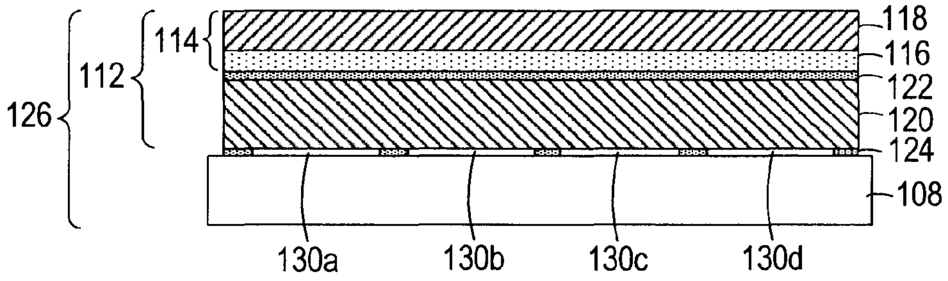
FIG. 1C is a schematic cross-sectional view of the top panel of the carton of FIG. 1A, taken along a line 1C-1C.

As illustrated schematically in FIGS. 1B and 1C, the supported susceptor film 112 includes a susceptor film 114, namely, a layer of microwave energy interactive material 116 supported on a polymer film 118. The susceptor film 114 is joined to a dimensionally stable support layer 120 (with the microwave energy interactive material 116 being disposed between the polymer film 118 and support layer 120) using a substantially continuous layer of adhesive 122 to collectively define the supported susceptor film 112. The supported susceptor film 112 may be joined to an adjoining layer 108 (e.g., paper, paperboard, or other paper-based material) using an adhesive material 124 to generally define a susceptor structure (or supported susceptor structure) 126. In this example, the adjoining layer 108 comprises the top panel 108 of carton 100. However, in other embodiments, the adjoining layer may a wall, panel, or other portion of another carton, pouch, sleeve, card, or other construct.

The supported susceptor structure 112 may be joined to the top panel 108 by an adhesive or adhesive material 124 (schematically delineated in FIG. 1A with dashed lines and heavier stippling), which may be positioned between the support layer 120 of the supported susceptor film 112 and the adjoining layer, in this example, top panel 108. Although the adhesive 124 may have any suitable pattern or configuration, at least a portion of the adhesive 124 may be generally configured to extend in the cross direction (CD) across at least a portion of the adjoining layer 108. In this manner, the adhesive 124 serves to impart dimensional stability to the adjoining layer (e.g., a panel of a carton, for example, panel 108 of carton 100), so that when the carton is subjected to freezing and thaw cycles in a freezer, the adjoining layer can absorb and release moisture without having a tendency to warp or buckle.

In the example illustrated schematically in FIG. 1A, the adhesive 124 is generally configured as a plurality of substantially rectangular adhesive regions or areas 124*a*, 124*b*, 124*c*, 124*d*, 124*e* (e.g., bands or strips) extending in the cross direction (CD) (e.g., a first direction) and a pair of substantially rectangular adhesive regions 124*f*, 124*g* (e.g., bands or strips) extending in the machine direction (MD) (e.g., a second direction) along opposite ends of adhesive regions 124*a*, 124*b*, 124*c*, 124*d*, 124*e*. In the illustrated embodiment, each adhesive region 124*a*, 124*b*, 124*c*, 124*d*, 124*e*, 124*f*, 124*g* comprises a substantially continuous layer of adhesive. However, in other embodiments, one or more of adhesive regions 124*a*, 124*b*, 124*c*, 124*d*, 124*e*, 124*f*, 124*g* may comprise a discontinuous layer of adhesive, a patterned adhesive, or otherwise.

More particularly, in this example, adhesive regions 124*a*, 124*e* are each substantially rectangular in shape and lie along respective first and second marginal areas 128*a*, 128*b* of the adjoining layer (e.g., top panel 108) proximate to a first pair of opposed (i.e., opposite) peripheral edges of the adjoining layer extending in the cross direction (CD). Likewise, adhesive regions 124*f*, 124*g* are each substantially rectangular in shape and lie along respective third and fourth marginal areas 128*c*, 128*d* of the adjoining layer (e.g., top panel 108) proximate to opposed (i.e., opposite) peripheral edges of the adjoining layer extending in the machine direction (MD).

Adhesive regions 124*a*, 124*e* are substantially parallel to one another and adhesive regions 124*f*, 124*g* are substantially parallel to one another. Adhesive areas 124*a*, 124*e* generally extend between opposite ends of adhesive regions 124*f*, 124*g* (or adhesive regions 124*f*, 124*g* generally extend between opposite ends of adhesive areas 124*a*, 124*e*), such that adhesive regions 124*a*, 124*e*, 124*f*, 124*g* collectively define an adhesive area that is square or square annular in shape (i.e., having the shape of a square annulus). Adhesive regions 124*b*, 124*c*, 124*d* extend between adhesive regions 124*f*, 124*g*, or conversely, adhesive regions 124*f*, 124*g* can be said to extend along the respective first and second ends of adhesive regions 124*b*, 124*c*, 124*d*. However, countless variations may be used. Further, it will be appreciated that the precise boundaries between the various overlapping and/or abutting adhesive regions may be difficult to discern. It will be understood that the characterization of various overlapping and/or contiguous adhesive areas as individual or discrete regions is for purposes of description only, and is not intended to be limiting in any manner.

A non-adhesive (i.e., unjoined) area 130*a*, 130*b*, 130*c*, 130*d* is disposed between each pair of adhesive regions 124*a*, 124*b*, 124*c*, 124*d*, 124*e*. In this example, the minor dimension d1 of the adhesive regions 124*a*, 124*b*, 124*c*, 124*d*, 124*e* is less than the minor dimension d2 of the non-adhesive areas. However, other possibilities are contemplated.

Figure 3:
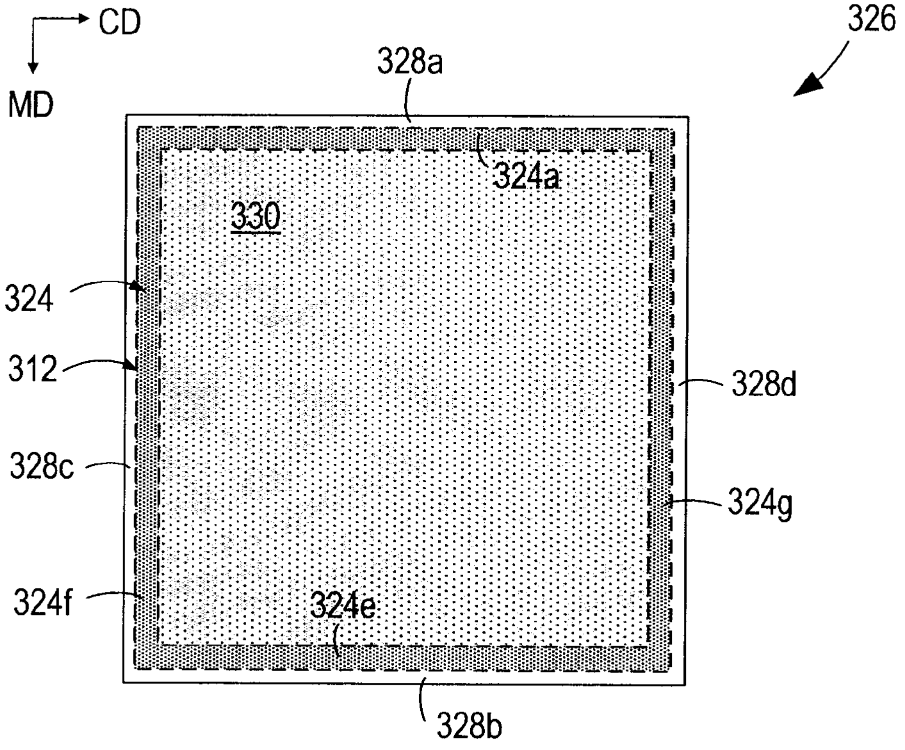
FIG. 3 is a schematic plan view of the top panel of the carton of FIG. 1A, with the supported susceptor structure being joined to the top panel using an adhesive having a third exemplary configuration.
Figure 4:
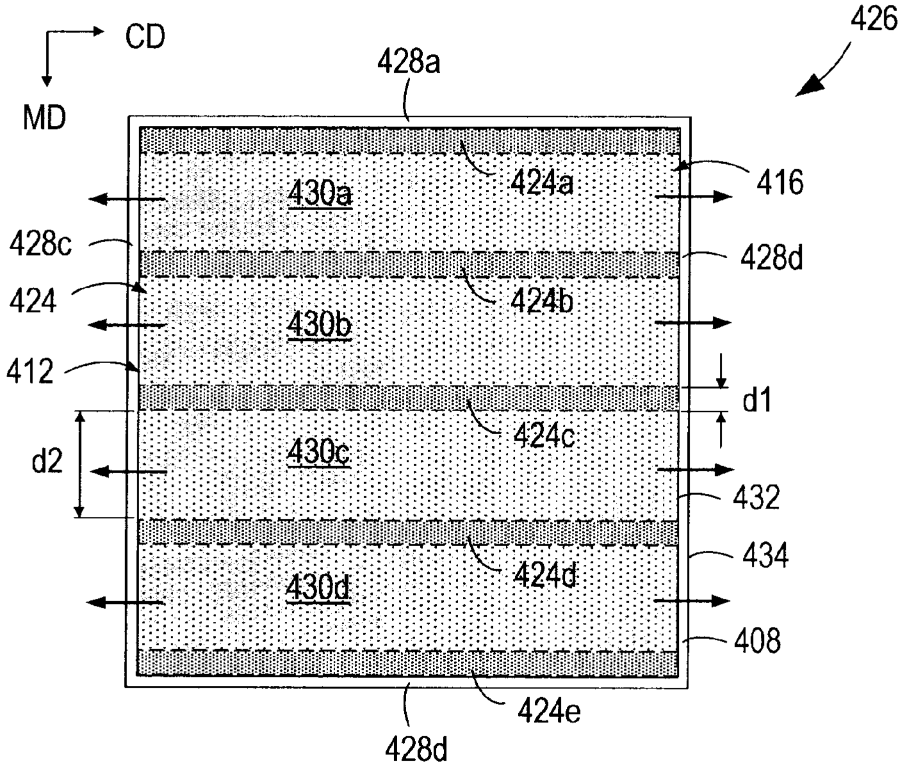
FIG. 4 is a schematic plan view of the top panel of the carton of FIG. 1A, with the supported susceptor structure being joined to the top panel using an adhesive having a fourth exemplary configuration.
Figure 5A:
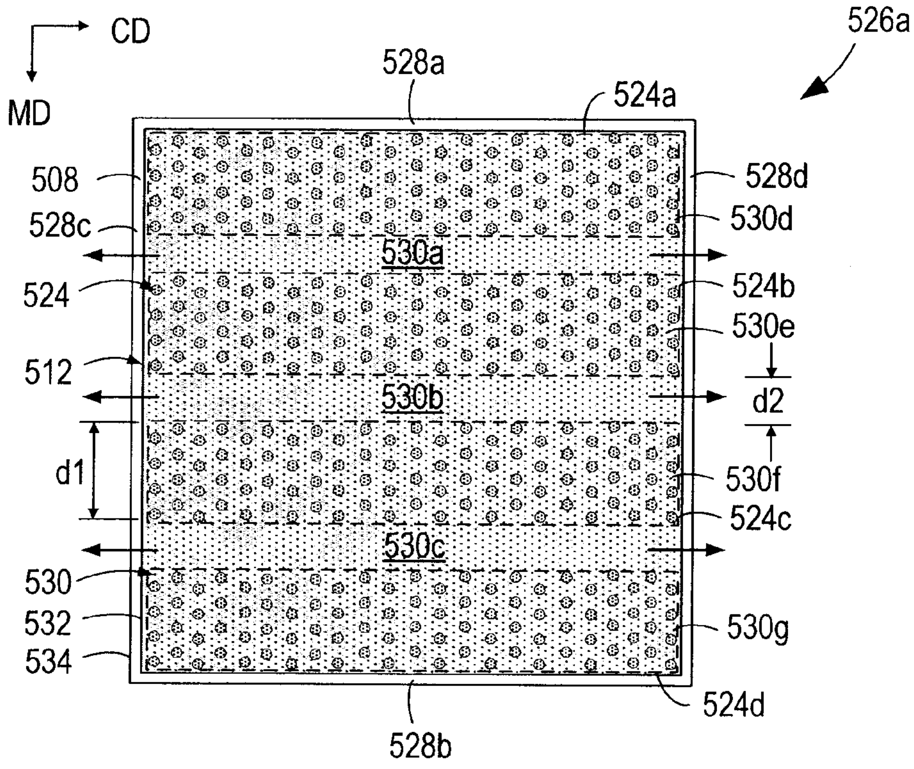
FIG. 5A is a schematic plan view of the top panel of the carton of FIG. 1A, with the supported susceptor structure being joined to the top panel using an adhesive having a fifth exemplary configuration.
Figure 5B:
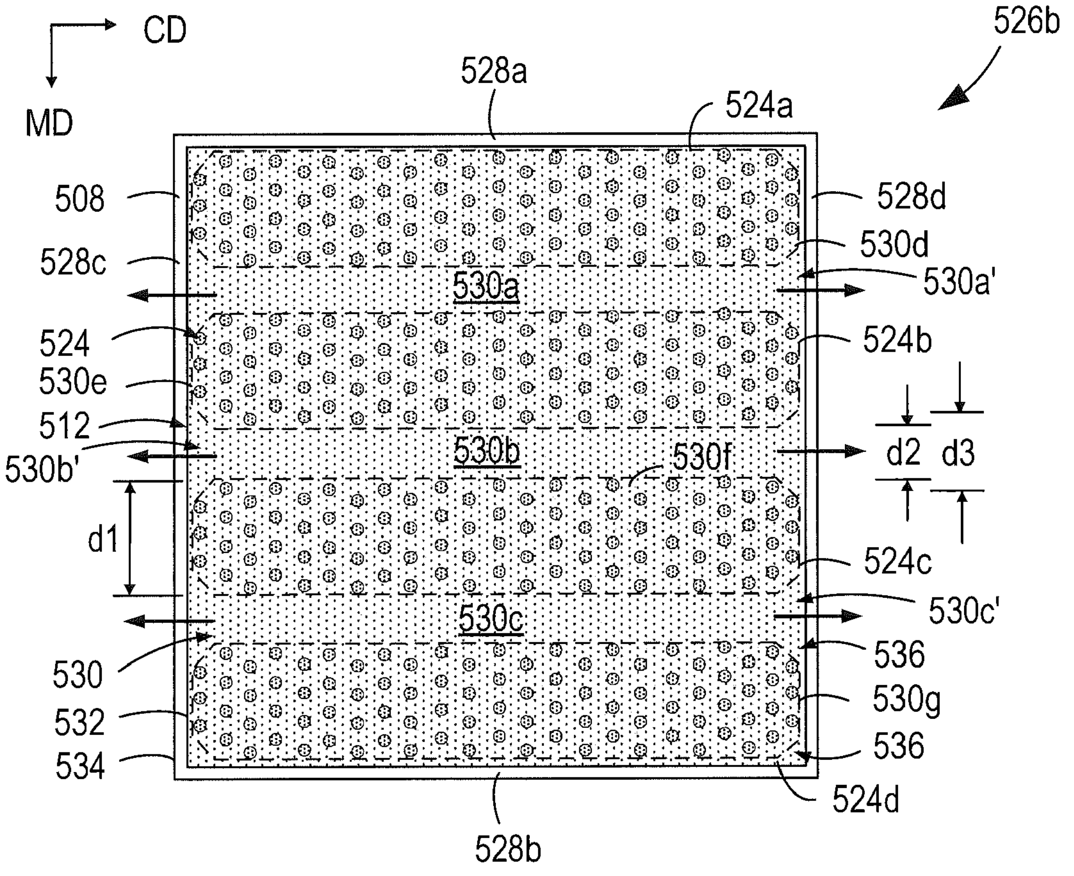
FIG. 5B is a schematic plan view of the top panel of the carton of FIG. 1A, with the supported susceptor structure being joined to the top panel using an adhesive having a sixth exemplary configuration that is a variation of the fifth exemplary configuration of FIG. 5A.

For example, FIGS. 2-5B illustrate various other susceptor structures 226, 326, 426, 526*a*, 526*a*. Such structures may have features similar to those illustrated in FIGS. 1A-1C, except for variations noted and variations that will be apparent to those of skill in the art. For purposes of convenience, similar features are given similar reference numerals, except that the "1" is replaced with "2" (FIG. 2), "3" (FIG. 3), "4" (FIG. 4), and "5" (FIGS. 5A and 5B). While such structures are illustrated schematically as alternative examples of top panel 108 of the carton 100 of FIG. 1A, it will be appreciated that the adjoining layer or panel may have any suitable shape and configuration and may form a part of any carton, package, or other construct.

Figure 2:
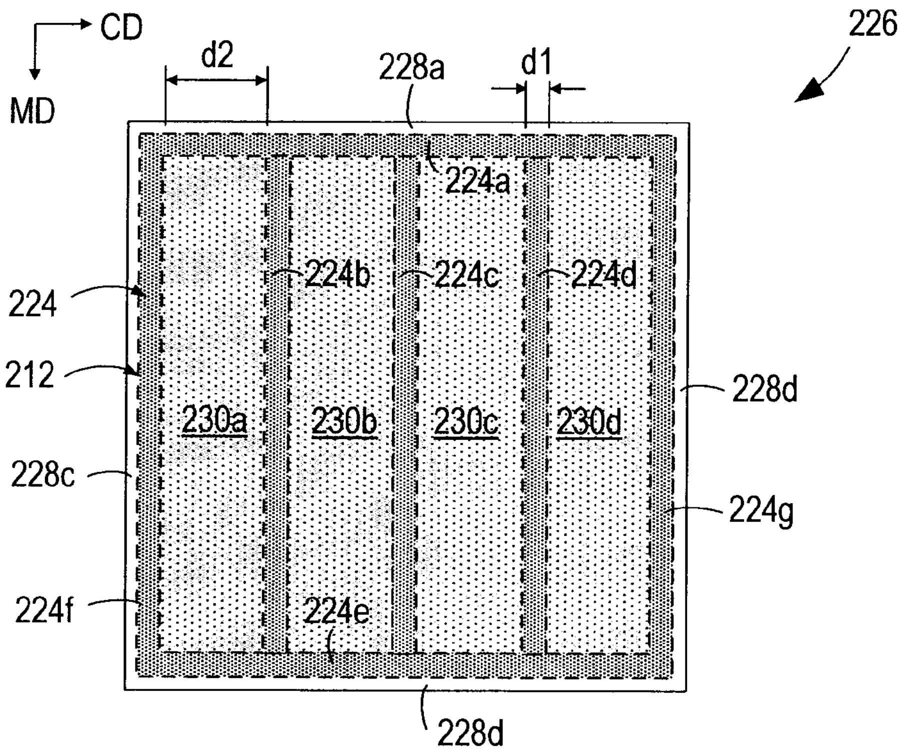
FIG. 2 is a schematic plan view of the top panel of the carton of FIG. 1A, with the supported susceptor structure being joined to the top panel using an adhesive having a second exemplary configuration.

In the exemplary structure 226 illustrated in FIG. 2, adhesive regions 224*b*, 224*c*, 224*d* extend in the machine direction (MD) (e.g., the second direction).

In the exemplary structure 326 illustrated in FIG. 3, fewer adhesive areas in the cross direction (CD) (e.g., the first direction) are provided. Specifically, only the two outermost adhesive regions 324*a*, 324*e* are provided, so that the adhesive 324 is configured as a square (e.g., as a square annulus or having a square annular shape) with a single non-adhesive region 330 between the adhesive regions 324*a*, 324*e*, 324*f*, 324*g*.

In the structure 426 of FIG. 4, adhesive regions 124*f*, 124*g* of FIG. 1A are omitted. The non-adhesive or unjoined regions 430*a*, 430*b*, 430*c*, 430*d* may serve as and/or at least partially define one or more venting channels or passageways that are in open communication with the exposed or open (e.g., unglued) peripheral edges 432, 434 of the adjacent layers of the structure (e.g., the support layer and adjoining layer 408, respectively; see, e.g., layers 108, 120 of FIGS. 1A and 1B). When the susceptor structure 426 is exposed to microwave energy, the layer of microwave energy interactive material 416 (e.g., see layer 116 of FIGS. 1A and 1B) heats, thereby causing the moisture in the support layer (e.g., see layer 120 of FIGS. 1A and 1B) to be converted into water vapor. The water vapor may be transported through the unjoined areas 430*a*, 430*b*, 430*c*, 430*d* (i.e., the areas not occupied by adhesive) to the exposed or unglued peripheral edges 432, 434 of the structure 426 (e.g., the edges of panel 408 or support layer), where the water vapor can be released, as indicated schematically with arrows. As a result, the various layers of the structure 426 are able to sustain heating without being prone to delamination. In contrast, as stated above, the present inventors have found that where a continuous layer of adhesive is used, the layers may tend to delaminate from one another during use.

In the exemplary structure 526*a* illustrated in FIG. 5A, the adhesive regions 124*e*, 124*f*, 124*g* of FIG. 1A are omitted. Further, adhesive regions 524*a*, 524*b*, 524*c*, 524*d* have a first dimension d1 that is greater than the first dimension d2 of the non-adhesive areas or vents 530*a*, 530*b*, 530*c* between the adhesive regions 524*a*, 524*b*, 524*c*, 524*d* (generally delineated with dashed lines). Additionally, the adhesive 524 in each adhesive region 524*a*, 524*b*, 524*c*, 524*d* is configured in a discontinuous, patterned configuration as a plurality of smaller adhesive elements or "dots", with each adhesive dot being circumscribed by a non-adhesive region 530*d*, 530*e*, 530*f*, 530*g*. As a result, the non-adhesive regions 530*a*, 530*b*, 530*c* between adhesive regions 524*a*, 524*b*, 524*c*, 524*d* are contiguous and interconnected with one another by non-adhesive regions 530*d*, 530*e*, 530*f*, 530*g* to form a substantially continuous network of non-adhesive regions 530. Such a network of unjoined areas may serve as passageways for releasing moisture along the periphery of the structure, as described above in connection with FIG. 4.

If needed, the ends 536 of the adhesive regions 524*a*, 524*b*, 524*c*, 524*d* may be tapered, so that the dimension d2 of the non-adhesive regions 530*a*, 530*b*, 530*c* increases to a dimension d3 proximate to the ends 530*a*', 530*b*', 530*c*' (only some of which are labeled) of the non-adhesive areas 530*a*, 530*b*, 530*c*, as shown with the exemplary structure 526*b* of FIG. 5B (in which only one end of adhesive region 524*d* is labeled). By providing a wider venting path, the venting of moisture from the structure 526*b* may be facilitated further.

In either case, the adhesive elements or "dots" 524 may have any suitable size, shape, spacing, and arrangement. For example, the adhesive dots may be substantially circular in shape. The adhesive dots may have a diameter of from about 0.005 in. to about 0.5 in., for example, from about 0.01 in. to about 0.25 in., for example, from about 0.05 in. to about 0.1 in., for example, about 0.0625 in. or about 0.125 in. The adhesive dots may be spaced from about 0.005 in. to about 0.5 in. apart (i.e., from an adjacent adhesive dot), for example, from about 0.01 in to about 0.25 in, for example, from about 0.05 in. to about 0.1 in., for example, about 0.0625 in. Thus, in one particular embodiment, the adhesive dots may have a diameter of about 0.0625 in. and may be spaced about 0.0625 in. apart. In another particular embodiment, the adhesive dots may have a diameter of about 0.125 in. and may be spaced about 0.0625 in. apart. However, countless other shapes, dimensions, and configurations of adhesive areas may be used, depending on the needs of the particular heating application.

Similarly, the first dimension d2 of non-adhesive regions or vents 530*a*, 530*b*, 530*c* may vary for each application. For example, non-adhesive areas 530*a*, 530*b*, 530*c* may have a dimension d2 of from about 0.005 in. to about 0.5 in., for example, from about 0.01 in. to about 0.4 in, for example, about 0.25 in. However, numerous configurations of adhesive areas and non-adhesive areas may be used.

The various structures 126, 226, 326, 426, 526*a*, 526*b* illustrated schematically herein and numerous others encompassed hereby may be used to form various microwave heating constructs, including, for example, cartons, trays, platforms, disks, sleeves, pouches, and so forth. Such packages and other constructs may undergo numerous freezing and thawing cycles, during which the presence of the adhesive extending in the cross direction stabilizes the construct to prevent it from buckling.

In general, to use a construct including such a supported susceptor structure, a food item may be placed on the outermost surface (i.e., the exposed side) of polymer film layer (e.g., polymer film 118) and placed in a microwave oven. Where the structure comprises a portion of a panel of a carton, for example, as shown in FIG. 1A, the user may be instructed to at least partially separate the panel from the package prior to heating (e.g., along line of disruption 110 of the carton 100 of FIG. 1A). Other possibilities are contemplated.

Upon sufficient exposure to microwave energy, the microwave energy interactive material (e.g., susceptor 116) converts at least a portion of the impinging microwave energy into thermal energy, which then can be transferred through the polymer film layer (e.g., polymer film 118) to enhance heating, browning, and/or crisping of the lower surface of the food item F. Any water vapor generated by the heating of the susceptor can be released from the support layer (e.g., support layer 120) and transported through the venting passageways, where provided, (e.g., vents 430*a*, 430*b*, 430*c*, 430*d*, 530*a*, 530*b*, 530*c*) to the exposed peripheral edges (e.g., edges 432, 434, 532, 534) of the structure or construct to further enhance heating, browning, and/or crisping of the food item, and where applicable, to minimize or prevent any potential delamination during microwave heating.

It will be understood that with conventional paper or paperboard, the fibers typically align in the machine direction, as discussed above. However, it is contemplated that if a paper or paper-based material is formed with the fibers aligned in the cross direction, the stabilizing force (and adhesive) may need to extend in the machine direction (instead of the cross direction). Nonetheless, the principles of this disclosure still apply. Therefore, the present disclosure contemplates both possibilities.

Numerous microwave heating constructs are encompassed by the disclosure. Any of such structures or constructs may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the construct.

The microwave energy interactive material (e.g., susceptor 116) may be an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the microwave energy interactive material may be carbon-based, for example, as disclosed in U.S. Pat. Nos. 4,943,456, 5,002,826, 5,118,747, and 5,410,135.

In still other embodiments, the microwave energy interactive material may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

If desired, the polymer film on which the microwave energy interactive material is supported (e.g., polymer film 118) may undergo one or more treatments to modify the surface prior to depositing the microwave energy interactive material onto the polymer film. By way of example, and not limitation, the polymer film may undergo a plasma treatment to modify the roughness of the surface of the polymer film. While not wishing to be bound by theory, it is believed that such surface treatments may provide a more uniform surface for receiving the microwave energy interactive material, which in turn, may increase the heat flux and maximum temperature of the resulting susceptor structure. Such treatments are discussed in U.S. Patent Application Publication No. US 2010/0213192 A1, published Aug. 26, 2010.

Also, if desired, the susceptor may be used in conjunction with other microwave energy interactive elements and/or structures. Structures including multiple susceptor layers are also contemplated. It will be appreciated that the use of the present susceptor film and/or structure with such elements and/or structures may provide enhanced results as compared with a conventional susceptor.

By way of example, the susceptor may be used with a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid "patch" generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Marietta, Ga.) under the trade name MicroRite® packaging material. In other examples, a plurality of microwave energy reflecting elements may be arranged to form a microwave energy distributing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563.

In still another example, the susceptor and/or susceptor structure may be used with or may be used to form a microwave energy interactive insulating material. Examples of such materials are provided in U.S. Pat. No. 7,019,271, U.S. Pat. No. 7,351,942, and U.S. Patent Application Publication No. 2008/0078759 A1, published Apr. 3, 2008.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of microwave energy interactive material available for heating, browning, and/or crisping the surface of the food item. Thus, the relative amounts of microwave energy interactive areas and microwave energy transparent areas must be balanced to attain the desired overall heating characteristics for the particular food item.

In some embodiments, one or more portions of the susceptor may be designed to be microwave energy inactive to ensure that the microwave energy is focused efficiently on the areas to be heated, browned, and/or crisped, rather than being lost to portions of the food item not intended to be browned and/or crisped or to the heating environment.

In other embodiments, it may be beneficial to create one or more discontinuities or inactive regions to prevent overheating or charring of the food item and/or the construct including the susceptor. By way of example, the susceptor may incorporate one or more "fuse" elements that limit the propagation of cracks in the susceptor structure, and thereby control overheating, in areas of the susceptor structure where heat transfer to the food is low and the susceptor might tend to become too hot. The size and shape of the fuses may be varied as needed. Examples of susceptors including such fuses are provided, for example, in U.S. Pat. No. 5,412,187, U.S. Pat. No. 5,530,231, U.S. Patent Application Publication No. US 2008/0035634A1, published Feb. 14, 2008, and PCT Publication No. WO 2007/127371, published Nov. 8, 2007.

In the case of a susceptor, any of such discontinuities or apertures may comprise a physical aperture or void in one or more layers or materials used to form the structure or construct, or may be a non-physical "aperture". A non-physical aperture is a microwave energy transparent area that allows microwave energy to pass through the structure without an actual void or hole cut through the structure. Such areas may be formed by simply not applying microwave energy interactive material to the particular area, by removing microwave energy interactive material from the particular area, or by mechanically deactivating the particular area (rendering the area electrically discontinuous). Alternatively, the areas may be formed by chemically deactivating the microwave energy interactive material in the particular area, thereby transforming the microwave energy interactive material in the area into a substance that is transparent to microwave energy (i.e., microwave energy inactive). While both physical and non-physical apertures allow the food item to be heated directly by the microwave energy, a physical aperture also provides a venting function to allow steam or other vapors or liquids released from the food item to be carried away from the food item.

The support layer (e.g., support layer 120) and may comprise any suitable material, for example, paper, paperboard, or a polymer film. The paper may have a basis weight of from about 15 to about 60 lb/ream (lb/3000 sq. ft.), for example, from about 20 to about 40 lb/ream, for example, about 25 lb/ream.

Likewise, the adjoining layer (e.g., panel 108) may be any suitable material, for example, paperboard. The paperboard may have a basis weight of from about 60 to about 330 lb/ream, for example, from about 80 to about 140 lb/ream. The paperboard generally may have a thickness of from about 6 to about 30 mils, for example, from about 12 to about 28 mils. In one particular example, the paperboard has a thickness of about 14 mils (0.014 inches). Any suitable paperboard may be used, for example, a solid bleached sulfate board, for example, Fortress® board, commercially available from International Paper Company, Memphis, Tenn., or solid unbleached sulfate board, such as SUS® board, commercially available from Graphic Packaging International. Further, it will be understood that additional layers may be joined to the adjoining layer (or to other layers) if desired, as will be evident from the remaining discussion.

The construct may be formed according to numerous processes known to those in the art, including using adhesive bonding, thermal bonding, ultrasonic bonding, mechanical stitching, or any other suitable process. Any of the various components used to form the package may be provided as a sheet of material, a roll of material, or a die cut material in the shape of the package to be formed (e.g., a blank).

This disclosure may be understood further from the following Example, which is not intended to be limiting in any manner.

EXAMPLE

Adhesive patterns similar to the adhesive patterns shown schematically in FIGS. 1A-5B were used to adhere a supported susceptor structure to a paperboard panel of a microwave heating package. Each package was placed in a 0° F. freezer, then removed and placed into a controlled humidity chamber for predetermined amounts of time to thaw (e.g., 30 minutes at 72° F. and 45% relative humidity; or 60 minutes at 73° F. and 50% relative humidity). Cycles were repeated for up to 13 days. The amount of warping over time was noted. Selected samples were also heated in a microwave oven according to the package directions.

For comparison, a control sample comprising a continuous layer of adhesive (i.e., flood coat) was also evaluated. The control sample was effective at stabilizing the panel and preventing buckling during the freeze and thaw cycles. However, the supported susceptor patch exhibited significant blistering (i.e., delamination) when heated in a microwave oven according to package directions.

The remaining samples using the adhesive patterns of FIGS. 1A-5B were effective at both stabilizing the panel to prevent buckling during the freeze and thaw cycles. Additionally, no delamination occurred during microwave heating according to package directions.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A microwave energy interactive structure comprising:
- a susceptor film comprising microwave energy interactive material on a polymer film;
- a support layer joined to the microwave energy interactive material; and
- an adjoining layer joined to the support layer such that the support layer is disposed between the susceptor film and the adjoining layer, wherein the adjoining layer comprises a paper-based material having a machine direction and a cross direction,
- wherein the adjoining layer is joined to the support layer by a first adhesive region and a second adhesive region, wherein the first adhesive region lies along a first marginal area of the adjoining layer, and the second adhesive region lies along a second marginal area of the adjoining layer, the first marginal area and the second marginal area being opposite one another, and the first adhesive region and the second adhesive region each extending in the cross direction across at least a portion of the adjoining layer, wherein a non-adhesive region is disposed between the first adhesive region and second adhesive region.

2. The structure of claim 1, wherein at least one of the first adhesive region and the second adhesive region is generally rectangular in shape.

3. The structure of claim 1, wherein the adjoining layer is further joined to the support layer by a third adhesive region extending in the machine direction substantially from the first adhesive region to the second adhesive region.

4. The structure of claim 3, wherein the third adhesive region extends from a first end of the first adhesive region to a first end of the second adhesive region.

5. The structure of claim 4, wherein the adjoining layer is further joined to the support layer by a fourth adhesive region extending in the machine direction substantially from the first adhesive region to the second adhesive region.

6. The structure of claim 5, wherein the fourth adhesive region extends from a second end of the first adhesive region to a second end of the second adhesive region, the respective second ends of the first adhesive region and the second adhesive region being opposite the respective first ends of the first adhesive region and the second adhesive region, such that the first adhesive region, second adhesive region, third adhesive region, and fourth adhesive region collectively generally define a square annular shaped adhesive region.

7. The structure of claim 6, wherein the first adhesive region, second adhesive region, third adhesive region, and fourth adhesive region of the square shaped adhesive region are each disposed proximate to respective peripheral edges of the adjoining layer.

8. The structure of claim 1, wherein the first adhesive region and the second adhesive region are first and second adhesive regions of a plurality of adhesive regions extending in the cross direction across at least a portion of the support layer, the adhesive regions being spaced apart from one another by non-adhesive regions.

9. The structure of claim 1, further comprising a third adhesive region and a fourth adhesive region extending in the cross direction across at least a portion of the adjoining layer.

10. The structure of claim 9, wherein the third adhesive region and the fourth adhesive region are spaced from one another by a non-adhesive region.

11. The structure of claim 1, wherein the first adhesive region and the second adhesive region each have tapered ends.

12. The structure of claim 1, wherein the non-adhesive region between the first adhesive region and the second adhesive region has widened ends.

13. The structure of claim 1, wherein the first adhesive region and the second adhesive region each comprise a plurality of adhesive areas spaced apart from one another.

14. The structure of claim 13, wherein the adhesive areas comprise dots.

15. The structure of claim 13, wherein the adhesive areas comprise an adhesive material.

16. The structure of claim 1, wherein the paper-based material of the adjoining layer comprises paper or paperboard.

17. The structure of claim 1, wherein the adjoining layer comprises a panel of a carton.

18. The structure of claim 1, wherein
- the adjoining layer comprises a first peripheral edge and a second peripheral edge opposite one another and a third peripheral edge and a fourth peripheral edge opposite one another,
- the first marginal area extends from the third peripheral edge to the fourth peripheral edge along the first peripheral edge of the adjoining layer, and
- the second marginal area extends from the third peripheral edge to the fourth peripheral edge along the second peripheral edge of the adjoining layer.

19. A method of making a microwave heating package for a frozen food item, the method comprising:
- joining a supported susceptor film to an adjoining layer, the adjoining layer comprising a paper-based material having a machine direction and a cross direction, wherein joining the supported susceptor film to the adjoining layer comprises joining the supported susceptor film to the adjoining layer so that the adjoining layer is joined to the supported susceptor film by a first adhesive region and a second adhesive region extending in the cross direction across at least a portion of the adjoining layer, wherein the first adhesive region lies along a first marginal area of the adjoining layer, and the second adhesive region lies along a second marginal area of the adjoining layer, the first marginal area and the second marginal area being opposite one another and wherein the first adhesive region and the second adhesive region are spaced apart from one another.

20. The method of claim 19, wherein the first adhesive region and the second adhesive region are spaced apart from one another by a non-adhesive region.

21. The method of claim 19, further comprising forming the supported susceptor film, wherein forming the supported susceptor film comprises joining a susceptor film to a support layer, wherein
- the susceptor film comprises microwave energy interactive material on a polymer film, and the support layer is joined to the microwave energy interactive material such that the microwave energy interactive material is disposed between the polymer film and the support layer.

22. The method of claim 19, further comprising forming a blank for the package, wherein the adjoining layer comprises a panel of the blank.

23. The method of claim 19, wherein joining the supported susceptor film to the adjoining layer comprises joining the supported susceptor film to the adjoining layer so that at least one of the first adhesive region and the second adhesive region is substantially rectangular in shape.

24. The method of claim 19, wherein joining the supported susceptor film to the adjoining layer comprises joining the supported susceptor film to the adjoining layer so that the adjoining layer is further joined to the support layer by a third adhesive region extending in the machine direction substantially from the first adhesive region to the second adhesive region.

25. The method of claim 24, wherein joining the supported susceptor film to the adjoining layer comprises joining the supported susceptor film to the adjoining layer so that the third adhesive region extends from a first end of the first adhesive region to a first end of the second adhesive region.

26. The method of claim 25, wherein joining the supported susceptor film to the adjoining layer comprises joining the supported susceptor film to the adjoining layer so that the adjoining layer is further joined to the support layer by a fourth adhesive region extending in the machine direction substantially from the first adhesive region to the second adhesive region.

27. The method of claim 26, wherein joining the supported susceptor film to the adjoining layer comprises joining the supported susceptor film to the adjoining layer so that the fourth adhesive region extends from a second end of the first adhesive region to a second end of the second adhesive region, the respective second ends of the first adhesive region and the second adhesive region being opposite the respective first ends of the first adhesive region and the second adhesive region, such that the first adhesive region, second adhesive region, third adhesive region, and fourth adhesive region collectively generally define a square annular shaped adhesive region.

28. The method of claim 27, wherein joining the supported susceptor film to the adjoining layer comprises joining the supported susceptor film to the adjoining layer so that the first adhesive region, second adhesive region, third adhesive region, and fourth adhesive region of the square shaped adhesive region are each disposed proximate to respective peripheral edges of the adjoining layer.

29. The method of claim 19, wherein joining the supported susceptor film to the adjoining layer comprises joining the supported susceptor film to the adjoining layer so that the supported susceptor film is joined to the adjoining layer by a third adhesive region and a fourth adhesive region extending in the cross direction across at least a portion of the adjoining layer.

30. The method of claim 19, wherein joining the supported susceptor film to the adjoining layer comprises joining the supported susceptor film to the adjoining layer so that the first adhesive region and the second adhesive region each have tapered ends.

31. The method of claim 19, wherein joining the supported susceptor film to the adjoining layer comprises joining the supported susceptor film to the adjoining layer so that the first adhesive region and the second adhesive region each comprise a plurality of adhesive areas spaced apart from one another.

32. The method of claim 31, wherein the adhesive areas comprise adhesive dots.

33. The method of claim 19, wherein the adjoining layer comprises a first peripheral edge and a second peripheral edge opposite one another and a third peripheral edge and a fourth peripheral edge opposite one another, the first marginal area extends from the third peripheral edge to the fourth peripheral edge along the first peripheral edge of the adjoining layer, and the second marginal area extends from the third peripheral edge to the fourth peripheral edge along the second peripheral edge of the adjoining layer.

* * * * *